United States Patent
Kim et al.

(10) Patent No.: US 12,461,060 B2
(45) Date of Patent: Nov. 4, 2025

(54) ELECTRICAL PROPERTY MEASURING DEVICE INCLUDING NON-UNIFORM MICROCHANNELS

(71) Applicant: SEOUL NATIONAL UNIVERSITY R&DB FOUNDATION, Seoul (KR)

(72) Inventors: Sung Jae Kim, Seoul (KR); Sungjae Ha, Gyeonggi-do (KR); Hyung Joo Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 604 days.

(21) Appl. No.: 17/879,866

(22) Filed: Aug. 3, 2022

(65) Prior Publication Data

US 2023/0037375 A1    Feb. 9, 2023

(30) Foreign Application Priority Data

Aug. 6, 2021  (KR) .................. 10-2021-0103689
Jun. 24, 2022  (KR) .................. 10-2022-0077312

(51) Int. Cl.
  *G01N 27/414*   (2006.01)
  *G01N 27/333*   (2006.01)

(52) U.S. Cl.
  CPC ..... *G01N 27/4145* (2013.01); *G01N 27/4146* (2013.01); *G01N 27/333* (2013.01)

(58) Field of Classification Search
  CPC .......... G01N 27/4145; G01N 27/4146; G01N 27/333
  See application file for complete search history.

(56) References Cited

FOREIGN PATENT DOCUMENTS

| JP | 5567571 B2 | 8/2014 |
| KR | 20040039567 A | 5/2004 |
| KR | 10-2012-0085211 A | 7/2012 |
| KR | 20190051096 A | 5/2019 |

OTHER PUBLICATIONS

Machine translation of KR 20190051096 (Year: 2019).*
Wang et al. Microfluidic Blood-Brain Barrier Model Provides In Vivo-Like Barrier Properties for Drug Permeability Screening Biotechnol Bioeng 2017; 114(1), pp. 1-25 (Year: 2017).*

(Continued)

*Primary Examiner* — Luan V Van
*Assistant Examiner* — Randall Lee Gamble, Jr.
(74) *Attorney, Agent, or Firm* — Bridgeway IP Law Group, PLLC; Sang Ho Lee; Hyun Woo Shin

(57) ABSTRACT

Provided is an electrical property measuring device capable of increasing reliability of evaluation of electrical properties of 3D structures such as living tissues and biomimetic structures and simplifying a measurement process by improving an ion concentration gradient caused by an ion concentration polarization phenomenon. The electrical property measuring device includes an ion-selective permeable membrane having a porous structure; and a non-uniform microchannel spaced apart from the ion-selective permeable membrane and including a plurality of parallelly arranged flow channels through which a fluid passes, wherein cross-sectional areas of the flow channels are different.

19 Claims, 6 Drawing Sheets

(56) References Cited

OTHER PUBLICATIONS

Park et al. Non-lithographic nanofluidic channels with precisely controlled circular cross sections 2018. RSC Adv. 8, 19651-19658 (Year: 2018).*
Lee, Hyekyung et al., "Overlimiting current in non-uniform arrays of microchannels", Bulletin of the American Physical Society, 71st Annual Meeting of the APS Division of Fluid Dynamics, vol. 63, No. 13, Nov. 19, 2018.
Toshihisa, Osaki et al., "Artificial cell membrane systems for biosensing applications", Analytical Chemistry, 2017, vol. 89, pp. 216-231.
Sohn, Seoyun, "Investigation of surface conduction-driven ion transport in non-uniform micro/nanofluidic channel networks", Master's Thesis, Seoul National University, Feb. 2021.
Kim, Sung Jae, "Overlimiting Current in Non-uniform Arrays of Microchannels", Youtube [online], Published Apr. 19, 2021, <URL: https://www.youtube.com/watch?v=UsQ1bVV5L6I>.
Lee, Hyekyung et al., "Overlimiting current in nonuniform arrays of microchannels: recirculating flow and anticrystallization", Nano Letters, 2021, vol. 21, pp. 5438-5446.

\* cited by examiner

ELECTRICAL PROPERTY MEASURING DEVICE INCLUDING NON-UNIFORM MICROCHANNELS

CROSS-REFERENCE TO RELATED APPLICATION

This application claims the benefit of Korean Patent Application No. 10-2021-0103689, filed on Aug. 6, 2021, and Korean Patent Application No. 10-2022-0077312, filed on Jun. 24, 2022, in the Korean Intellectual Property Office, the disclosure of which is incorporated herein in its entirety by reference.

BACKGROUND

1. Field

The present disclosure relates to an electrical property measuring device including non-uniform microchannels, and more particularly, to an electrical property measuring device including non-uniform microchannels in which fluidic channels having different cross-sectional areas are arranged in parallel.

2. Description of the Related Art

Ion-selective permeable membranes having ionic selectivity, such as membranous structures, ion-exchange membranes, and epithelial tissue which have pores with sizes of about 1 μm or less have been applied to a variety of microfluidic application technologies such as desalination equipment, battery separators, biomimetic structures, and living tissue tests. Particularly, electrical properties of a system including an ion-selective permeable membrane may be evaluated by measuring the magnitude of current passing through the above-described ion-selective permeable membrane. Because such methods for evaluating electrical properties are generally performed nondestructively, they are significantly preferred in the fields that require examination on living tissue or total inspection. For example, transepithelial electrical resistance (TEER) measurement has drawn attention as a valuable method for evaluating electrical properties such as barrier function of living tissues and 3D organoids.

However, in measurement of electrical current passing through a membrane, use of suitable electrodes and electrolytes is essential, it may be difficult to obtain stability of the electrical current transferred by ions contained in electrolyte, depending on an environment for the measurement or problems such as electrolysis and deposition of by-products may occur. Similar problems occur in the fields of microfluidic desalination equipment and battery separators.

In order to solve these problems, ion concentration polarization (ICP) phenomenon has been conventionally applied to the structure of the above-described ion-selective permeable membrane. The ion concentration polarization phenomenon refers to an ion transport phenomenon in which an ion depletion layer is formed at cathodic side and an ion enrichment layer is formed at anodic side in the case where a potential difference is applied to both ends of an anion-selective permeable membrane and an ion enrichment layer is formed at cathodic side and an ion depletion layer is formed at anodic side in the case where a potential difference is applied to both ends of an cation-selective permeable membrane.

Although the ion concentration polarization phenomenon is widely used as a basic mechanism of desalination or separation and concentration, by-products of operations accumulating in a microfluidic channel may be crystallized in the case where the mechanism of desalination, desalting, or the like is repeated for a long time, thereby causing performance deterioration in ion-selective membranes or microchannels. Therefore, a microfluidic device should be periodically cleaned or replaced to remove deposits, and accordingly there may be a problem of excessively increasing maintenance costs.

SUMMARY

An object of the present disclosure to solve the above-described problems is to provide an electrical property measuring device capable of increasing reliability of evaluation of electrical properties of 3D structures such as living tissues and biomimetic structures and simplifying a measurement process by improving an ion concentration gradient caused by an ion concentration polarization phenomenon.

However, these problems to be solved are illustrative and the scope of the present disclosure is not limited thereby.

Additional aspects will be set forth in part in the description which follows and, in part, will be apparent from the description, or may be learned by practice of the presented embodiments.

An aspect of the present disclosure to solve the above-described problems provides an electrical property measuring device.

The electrical property measuring device includes an ion-selective permeable membrane having a porous structure; and a non-uniform microchannel array spaced apart from the ion-selective permeable membrane and including a plurality of parallelly arranged flow channels through which a fluid passes, wherein cross-sectional areas of the flow channels are different.

According to an embodiment of the present disclosure, the non-uniform microchannel array may include a plurality of flow channels arranged to be spaced apart from each other at a predetermined interval, wherein a first flow channel having a relatively large cross-sectional area and a second flow channel having a relatively small cross-sectional area are arranged at adjacent positions.

According to an embodiment of the present disclosure, the cross-sectional area of the second flow channel may be in a range of 0.05 to 0.8 of the cross-sectional area of the first flow channel.

According to an embodiment of the present disclosure, an amount of ion transport of the non-uniform microchannels may vary according to a ratio between cross-sectional areas.

According to an embodiment of the present disclosure, current stability of the non-uniform microchannel array may vary according to a ratio between cross-sectional areas.

According to an embodiment of the present disclosure, the interval between the ion-selective permeable membrane and the non-uniform microchannel array may be from several to several hundreds of micrometers (μm).

According to an embodiment of the present disclosure, the flow channels may be aligned perpendicular to the ion-selective permeable membrane.

According to an embodiment of the present disclosure, the flow channels may have a circular or polygonal cross-section.

According to an embodiment of the present disclosure, one end and the other end of the flow channels may be formed open to allow inflow and outflow of a fluid in the non-uniform microchannel array.

According to an embodiment of the present disclosure, the ion-selective permeable membrane and the non-uniform microchannel array may be stacked in a well containing an electrolyte.

According to an embodiment of the present disclosure, the ion-selective permeable membrane may include a porous scaffold or matrix on which cells or tissues are able to be cultured.

According to an embodiment of the present disclosure, the ion-selective permeable membrane may further include a biological membrane derived from the cells or tissues and formed on the porous scaffold or matrix.

According to an embodiment of the present disclosure as described above, nondestructive inspection of electrical properties may be possible by including a recirculation flow using structural non-uniformity of a microchannel without using external energy, surface treatment of a microfluidic device, or chemical treatment of an electrolyte solution.

Also, stability of current measurement may be improved by inhibiting formation and growth of crystals caused by ion concentration and increasing electrical conductance using a recirculation flow activated by microchannels.

In addition, stable operation for a long time may be possible and power efficiency may be increased by decreasing frequency of formation of deposits in the measuring device and improving electrical conductance.

In addition, the device may be used to evaluate the state of biological tissue or properties of a biomimetic structure and may be applied to performance enhancement of a microfluidic system such as a battery separator.

However, the scope of the present disclosure is not limited by these effects.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
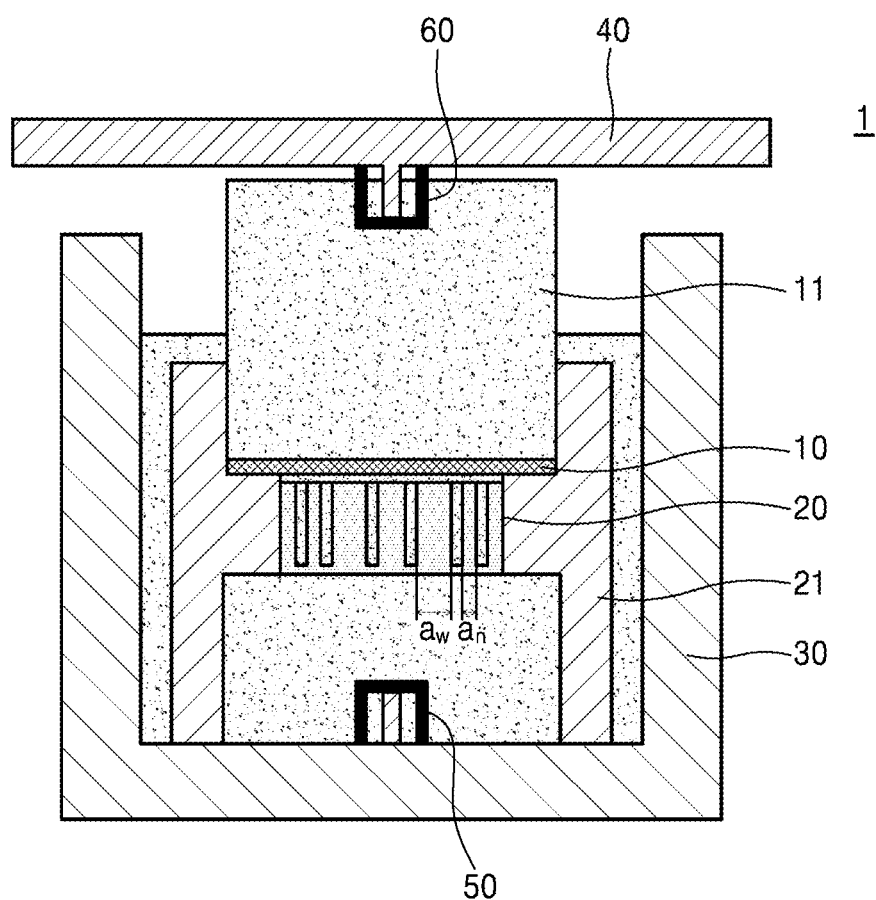
FIG. 1 is a schematic diagram of an electrical property measuring device including a non-uniform microchannel array according to an embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and some elements in the drawings may be exaggerated for descriptive convenience.

Hereinafter, embodiments of the present invention will be described in detail with reference to the accompanying drawings so that these embodiments may be readily implemented by those skilled in the art.

FIG. 1 is a schematic diagram of an electrical property measuring device 1 according to an embodiment of the present disclosure. Referring to FIG. 1, the electrical property measuring device 1 includes an ion-selective permeable membrane 10 having a porous structure and selectively transmitting ions and a non-uniform microchannel 20 disposed to be spaced apart from the ion-selective permeable membrane 10 at a predetermined interval and including a plurality of flow channels arranged in parallel such that a flow passes therethrough.

The electrical property measuring device 1 according to the present disclosure, an apparatus for measuring difference in currents or voltages passing through the ion-selective permeable membrane 10, is grafted on the non-uniform microchannel array 20 to induce a stationary recirculation flow and thus reliability of evaluation on electrical properties of a 3D structure such as biological tissue may be enhanced and stability of the device may be improved.

The electrical property measuring device 1 according to the present disclosure is provided in a such a manner that the ion-selective permeable membrane 10 and the non-uniform microchannel array 20 are located in an electrolyte solution and a cell for performing an electrochemical analysis is formed.

The ion-selective permeable membrane 10 may have a porous structure in which pores having sizes of several nanometers (nm) to several micrometers (μm) are formed.

The ion-selective permeable membrane 10 may be a porous membrane formed of a polymer material, but any membrane available for cell culture may be used without particular limitation. In the present disclosure, the ion-selective permeable membrane 10 may be used as a concept including a porous scaffold or matrix on which cells or tissues are able to be cultured and a cell membrane derived from the cells or tissues and formed on the porous scaffold or matrix.

An ion concentration polarization phenomenon occurring in the porous ion-selective permeable membrane 10 due to selective ion permeation may sometimes cause unstable measurement of electrical properties. In this case, an adjacent microchannel structure may be used to induce a recirculation flow and the induced recirculation flow may increase an ion concentration gradient and improve electrical conductance, thereby providing a stable current measuring device. The non-uniform microchannel array 20 inducing the recirculation flow will be described below.

In electrochemical analysis, two electrodes referred to as a counter electrode 50 and a working electrode 60 may be used. The counter electrode 50 and the working electrode 60 are also located in the electrolyte solution. The working electrode 60 is an electrode to be analyzed, and a current may be measured according to a potential applied thereto. The counter electrode 60 is an electrode for completing an electrical circuit. The counter electrode 50 and the working electrode 60 may be each independently a platinum electrode, a gold electrode, or a silver-silver chloride electrode, without being limited thereto.

In the present disclosure, an electrolyte material refers to a material expected to be precipitated or crystallized by concentration and may be a material including ions and a material including fine particles that may be dielectrically polarized by an electric field. The electrolyte material may be a body fluid, blood, microalgae, seawater, other fluids, or the like. An inorganic ion may be calcium, magnesium, carbonate, sulfate, phosphate, or the like, but is not limited thereto.

Figure 2:
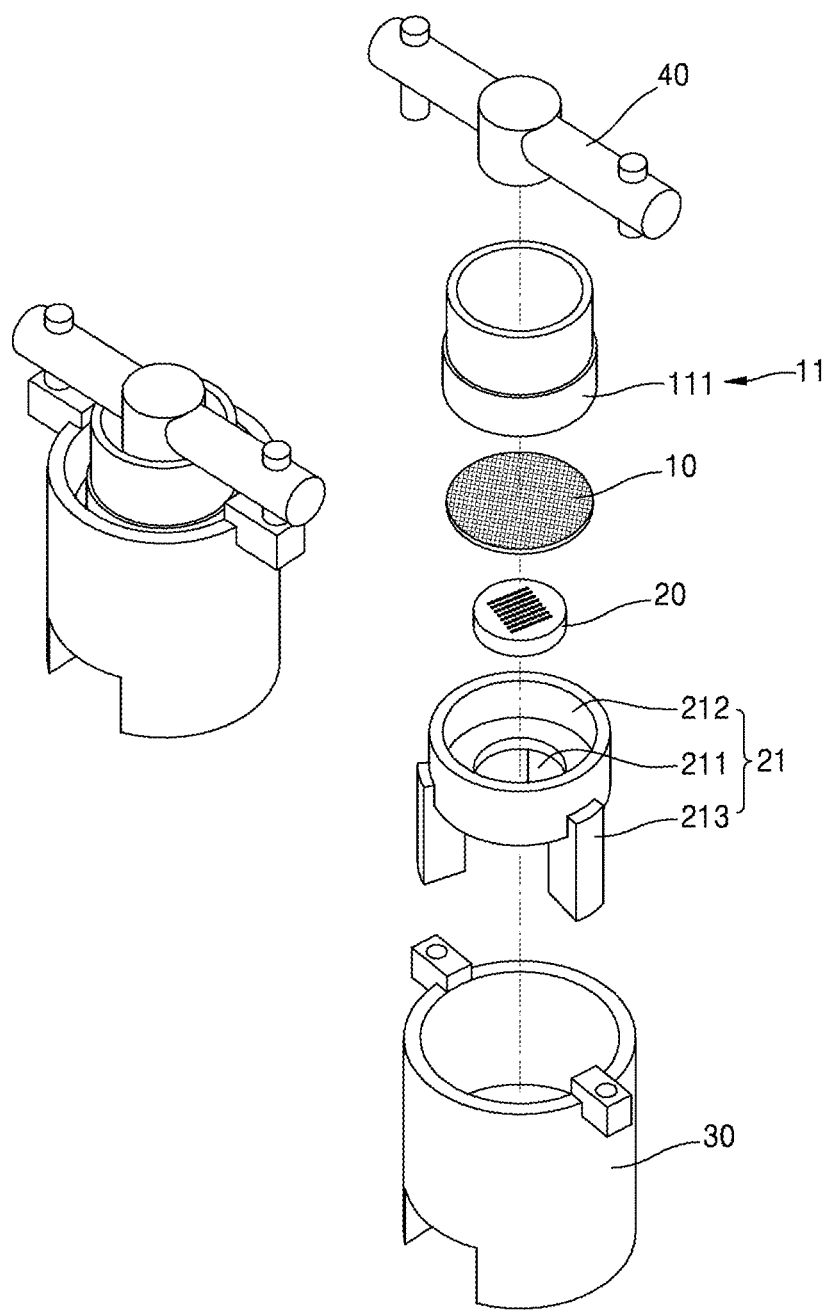
FIG. 2 is a diagram illustrating a stack structure of an electrical property measuring device according to an embodiment of the present disclosure.

FIG. 2 is a diagram three-dimensionally illustrating a stack structure of the electrical property measuring device according to an embodiment of the present disclosure.

First, provided is a well 30 in which a space for containing an electrolyte is formed.

Then, an insertion holder 21 is seated in the well 30, a through-hole 211 is formed at the center of the insertion holder 21, a protrusion 212 is formed on the periphery of one side, and a leg 213 is formed on the other side. The insertion holder 21 provides a space between the ion-selective permeable membrane 10 and the non-uniform microchannel array 20 to open one end and the other end of the flow channels, thereby playing a role in allowing inflow and outflow of a fluid. For example, the space between the ion-selective permeable membrane 10 and the non-uniform microchannel array 20 may be from several and several hundreds of micrometers (µm) in size. Three or more legs 213 may be provided to maintain balance. In addition, the leg 213 may be manufactured to have various heights in consideration of a height of the well 30 and a height of an ion-selective permeable membrane structure 11 which will be described later. The through-hole 211 formed at the center of the insertion holder 21 may be formed to correspond to a size of the non-uniform microchannel array 20, and accordingly, the non-uniform microchannel array 20 may be inserted into the through-hole 211 and fixed thereto.

The ion-selective permeable membrane structure 11 is stacked on the insertion holder 21, and an accommodating part 111 to accommodate the protrusion 212 of the insertion holder 21 may be formed on one surface of the ion-selective permeable membrane structure 11. The protrusion 212 of the insertion holder 21 may be engaged with the accommodating part 111 of the ion-selective permeable membrane structure 11 to fix the ion-selective permeable membrane 10 therebetween. The ion-selective permeable membrane structure 11 may support the ion-selective permeable membrane 10 when cells are cultured on the ion-selective permeable membrane 10. Meanwhile, the inner space of the ion-selective permeable membrane structure 11 may be filled with an electrolyte to measure a current passing through the ion-selective permeable membrane 10.

In addition, an electrode holder 40 may be stacked on the ion-selective permeable membrane structure 11, and a working electrode 60 is provided in a state of being adhered to the electrode holder 40. Thus, the working electrode 60 may be located in the electrolyte solution in which the ion-selective permeable membrane structure 11 is immersed.

Figure 3A:
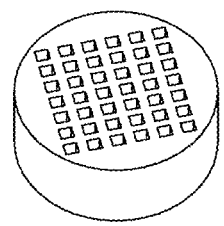
FIG. 3A is a schematic diagram illustrating a uniform microchannel and FIGS. 3B and 3C are schematic diagrams illustrating non-uniform microchannels.
Figure 3B:
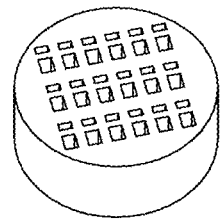
Figure 3C:
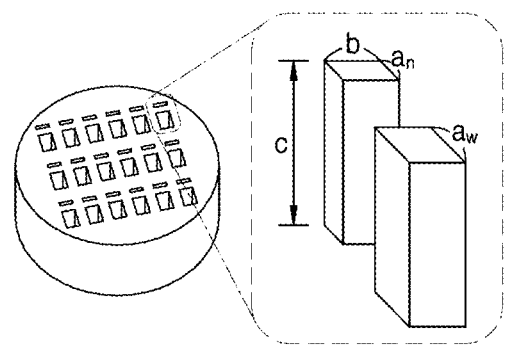

FIGS. 3A to 3C are schematic diagrams of microchannels inserted into an electrical property measuring device according to examples and comparative examples of the present disclosure. FIG. 3A shows a uniform microchannel, and FIGS. 3B and 3C show non-uniform microchannels.

In FIG. 3A, the uniform microchannel has a pattern in which a plurality of flow channels having the same cross-section and the same length (c) are spaced apart from each other at the same interval. Unlike this, the non-uniform microchannel array 20 shown in FIGS. 3B and 3C has a structure in which at least some of the plurality of flow channels have different cross-sectional areas. The plurality of flow channels are arranged at predetermined intervals. In this case, first flow channels having a relatively large cross-sectional area (width: $a_w$) and second flow channels having a relatively small cross-sectional area (width: $a_n$) may be arranged to be adjacent to each other. For example, one first flow channel and one second flow channel, as a pair, may be consecutively arranged. Accordingly, the first flow channels and the second flow channels may be alternately aligned.

Although the non-uniform microchannel has two different widths $a_w$ and $a_n$ in the embodiment of the present disclosure for reference, the embodiment is not limited thereto, and various flow channel models may be designed. For example, a third flow channel and a fourth flow channel having different cross-sectional areas from those of the first and second flow channels may further be added thereto.

In the non-uniform microchannel array 20, an internal recirculation flow is induced due to different flow rates and directions of fluids between the first flow channels and the second flow channels, and the induced recirculation flow may increase an ion concentration gradient and improve electrical conductance.

In an embodiment, inlets and outlets having circular or polygonal cross-sections are formed at one side and the other side of the first flow channels and the second flow channels, respectively. An internal cross-sectional area of the flow channel may vary according to the cross-sectional areas of the inlets and outlets. An amount on ion transport and current stability may vary according to a ratio of the first flow channel to the second flow channel. For example, the cross-sectional area of the second flow channel may be in the range of 0.05 to 0.8, more preferably, 0.2 to 0.8, of the cross-sectional area of the first flow channel.

Within the range of the embodiment of the present disclosure, as non-uniformity of the non-uniform microchannel array 20 increases, i.e., a difference between cross-sectional areas of the flow channels increases, electrical conductance may increase. This is because additional ion transport is increased due to the internal recirculation flow of the microchannel. Thus, in the case of FIG. 3C, electrical conductance may be measured higher than that of FIG. 3B due to the increased amount of ion transport. However, when the non-uniformity is out of a predetermined range, the amount of ion transport may decrease. For example, when the cross-sectional area of the second flow channel is less than 0.05 of the cross-sectional area of the first flow channel, the amount of ion transport may decrease.

In another aspect, within the range of non-uniformity according to the embodiment of the present disclosure, stable currents may be measured by the induced recirculation flow.

Hereinafter, the present invention will be described in more detail with reference to the following examples. However, these examples are made only for illustrative purposes, and the present invention is not construed as being limited to those examples.

EXAMPLES

For experimental verification of a recirculation flow, electrical property measuring devices were manufactured using a 3D printer approved for biocompatibility. As shown in FIGS. 3A to 3C, an electrical property measuring device having flow channels with a uniform cross-sectional area was prepared according to Comparative Example ($a_w$=400 and $a_n$=400), and those having flow channels with non-uniform cross-sections were prepared according to Example 1 ($a_w$=500 and $a_n$=300) and Example 2 ($a_w$=600 and $a_n$=200), such that surface conductance and bulk conductance were the same, in order to identify changes only by uniformity of the microchannel. A microchannel disk, which was prepared in a cylindrical shape and included a plurality of flow channels, had a thickness of 1.5 mm and a diameter of 8 mm, and the flow channel in the microchannel disk was prepared in a square pillar shape such that b=400 µm and c=1.5 mm. The numerical values are shown in Table 1 below.

TABLE 1

| | $a_w$ (µm) | $a_n$ (µm) | L(µm) = $2(a_w + a_n + 2b)$ | A(µm²) = $b(a_w + a_n)$ |
|---|---|---|---|---|
| Comparative Example | 400 | 400 | 3,200 (surface conductance) | 320,000 (bulk conductance) |
| Example 1 | 500 | 300 | | |
| Example 2 | 600 | 200 | | |

Experimental Example

Figure 4A:
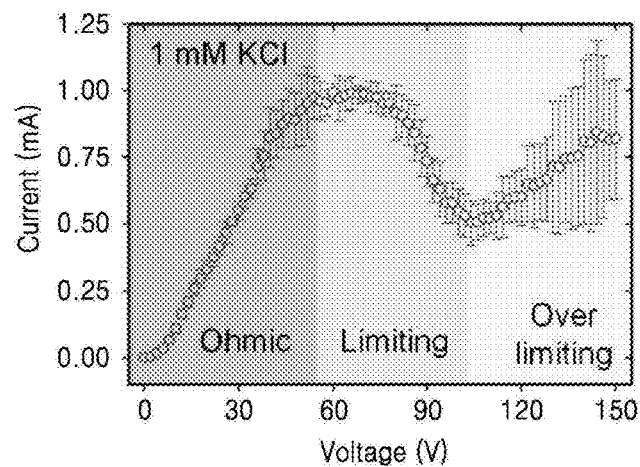
FIGS. 4A to 4C are graphs illustrating current-voltage characteristics measurement results from an electrical property measuring device according to an embodiment of the present disclosure.
Figure 4B:
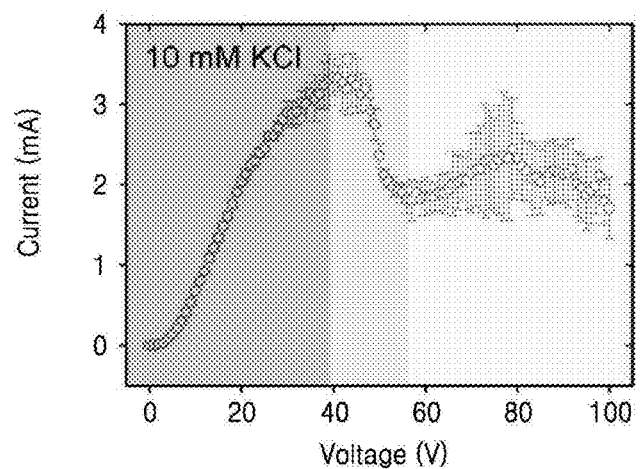
Figure 4C:
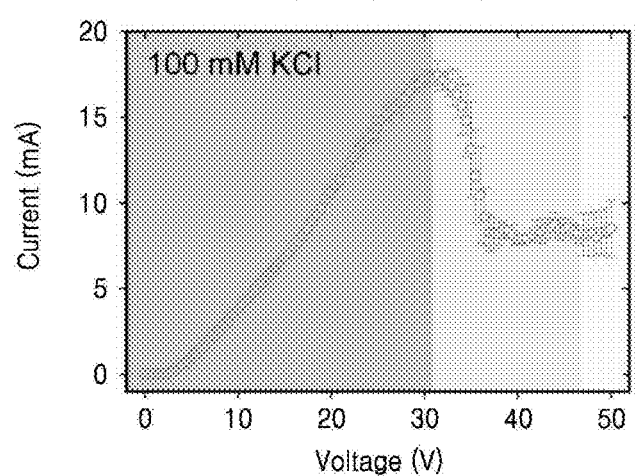

Current-voltage properties of the devices prepared in the above-described examples were observed in a solution having different molarities by using a KCL electrolyte solution having concentrations of 1, 10, and 100 mM as a cell culture solution. FIGS. 4A to 4C are current-voltage graphs obtained by applying a voltage of 0 to 150 V. A property of being divided into three distinct sections, i.e., Ohmic, Limiting, and Over limiting sections which are observed in systems having an ion-selective membrane, was confirmed.

Figure 5A:
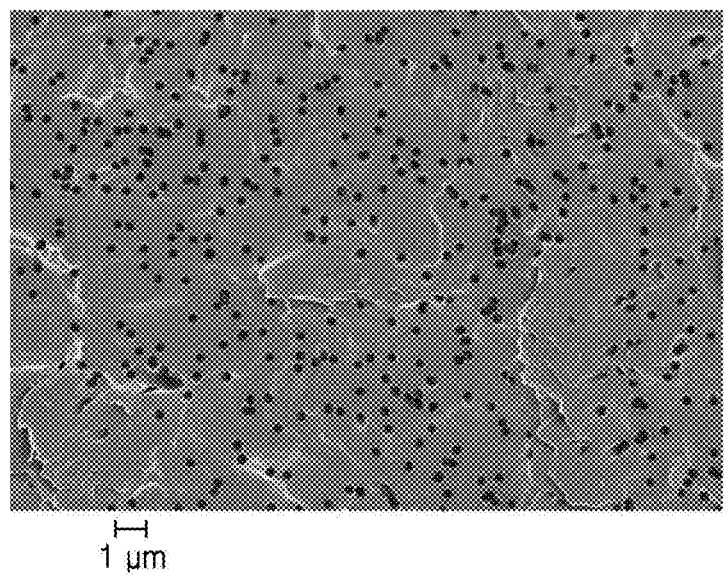
FIGS. 5A and 5B are electron microscope images of an ion-selective permeable membrane according to an embodiment of the present disclosure.
Figure 5B:
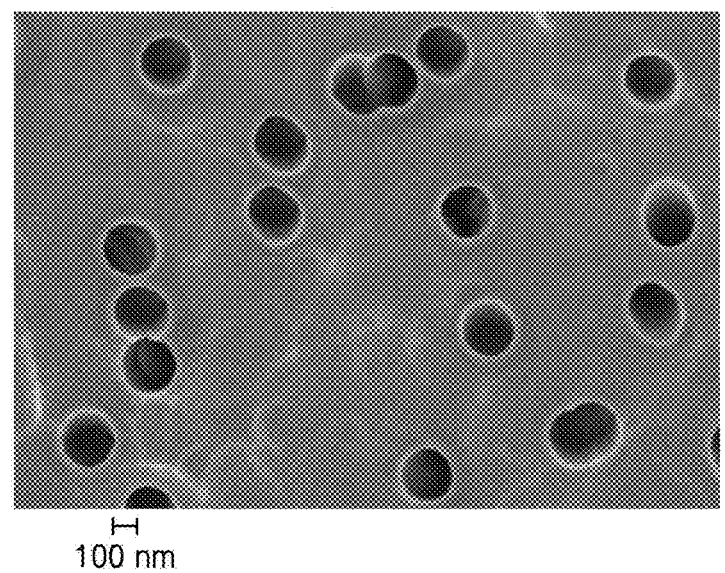

Electron microscope images of the ion-selective permeable membrane in the ion-selective permeable membrane structure at different magnifications are shown in FIGS. 5A and 5B. As a result of observation, it was confirmed that a diameter of a hole present in the ion-selective permeable membrane was 400 nm.

Figure 6A:
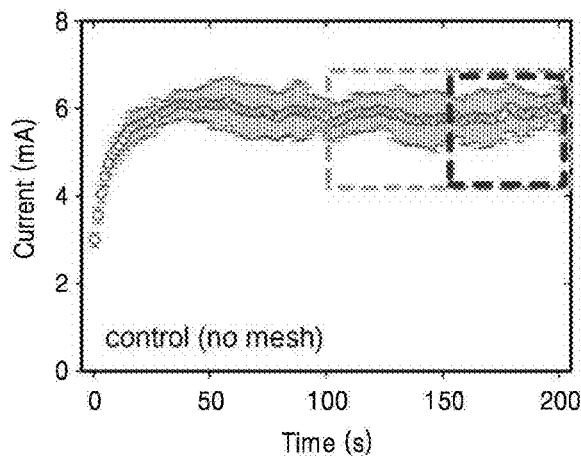
FIGS. 6A and 6B are graphs illustrating currents measured by an electrical property measuring devices according to a comparative example of the present disclosure.
Figure 6B:
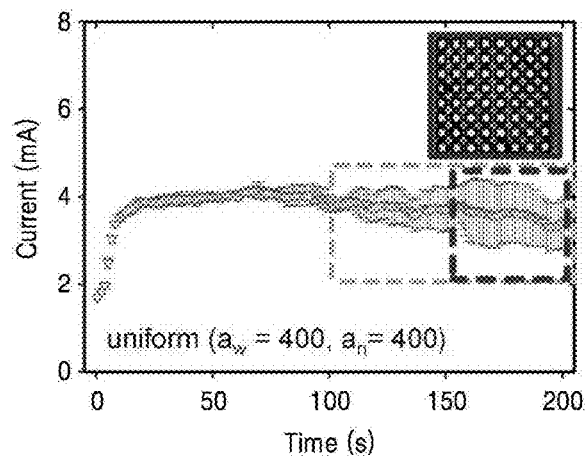
Figure 6C:
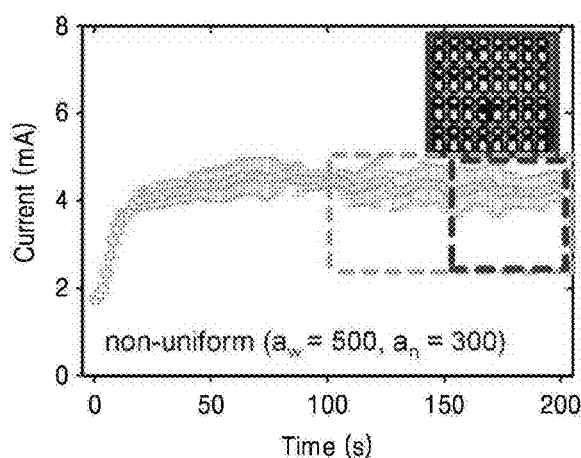
FIGS. 6C and 6D are graphs illustrating currents measured by electrical property measuring devices according to examples of the present disclosure.
Figure 6D:
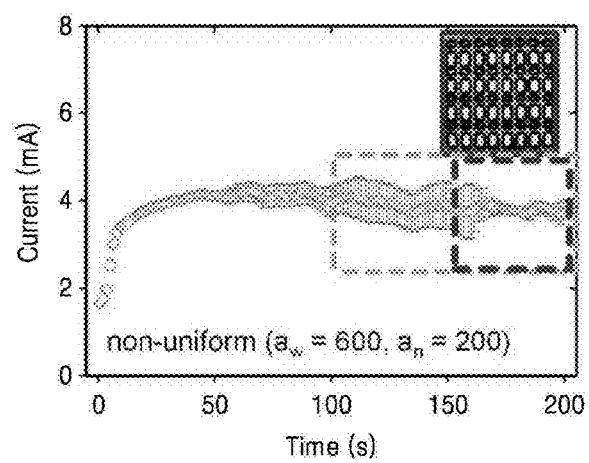

FIGS. 6A to 6D are current-time graphs of the electrical property measuring devices showing stability of a system using currents passing through the ion-selective permeable membrane. The currents were obtained for 200 seconds by applying a voltage of 60 V in the 10 mM KCl solution. FIG. 6A shows a case in which the microchannel was not used, FIG. 6B shows a case in which a uniform microchannel was inserted according to Comparative Example, and FIGS. 6C and 6D show cases in which non-uniform microchannels were included according to Example 1 and Example 2, respectively.

Table 2 below shows an increase and a decrease in average standard deviation of currents in the current-time graphs of FIGS. 6A to 6D.

TABLE 2

| Average standard deviation | Without microchannel | Comparative Example | Example 1 | Example 2 |
|---|---|---|---|---|
| Last 100 sec (%) | 7.8 (2%) | 12.3 (0) | 8.7 (−17%) | 8.1 (−29%) |
| Last 50 sec (%) | 8.4 (−5%) | 14.2 (0) | 9.1 (−24%) | 7.6 (−43%) |

Referring to FIGS. 6A to 6D and Table 2, the standard deviation of the current decreased over time in the case of including the non-uniform microchannels compared to the case where the non-uniform microchannels were not used. Particularly, as the degree of non-uniformity of the microchannel increases, the standard deviation of the current decreased more. In the case of FIG. 6D, it was confirmed that the standard deviation of the current decreased up to 43% during the last 50 seconds after 150 seconds. As such, in the case where a 3D electrical property measuring structure includes a non-uniform microchannel, effects on increasing electrical conductance and improving stability of current may be obtained by inducing a recirculation flow.

While exemplary embodiments have been shown and described above, it will be apparent to those skilled in the art that modifications and variations could be made without departing from the scope of the present invention as defined by the appended claims.

What is claimed is:

1. A three-dimensional electrical property measuring device comprising:
   a well having a space for containing an electrolyte therein;
   an insertion holder stacked on the well and having a through-hole at a center;
   an ion-selective permeable membrane stacked on the insertion holder and having a porous structure; and
   a non-uniform microchannel spaced apart from the ion-selective permeable membrane and inserted into the through-hole, and including a plurality of flow channels arranged in a three-dimensional lattice structure and through which a fluid passes,
   wherein at least one of the plurality of flow channels has cross-sectional area that is different from cross-sectional areas of other remaining flow channels of the plurality of flow channels.

2. The three-dimensional electrical property measuring device of claim 1, wherein the non-uniform microchannel includes the plurality of flow channels arranged to be spaced apart from each other at a predetermined interval,
   wherein a first flow channel of the plurality of flow channels having a relatively large sectional area and a second flow channel of the plurality of flow channels having a relatively small sectional area are arranged at adjacent positions.

3. The three-dimensional electrical property measuring device of claim 2, wherein the sectional area of the second flow channel is in a range of 0.05 to 0.8 of the sectional area of the first flow channel.

4. The three-dimensional electrical property measuring device of claim 1, wherein an amount of ion transport of the non-uniform microchannel varies according to a ratio of the cross-sectional areas between the plurality of flow channels.

5. The three-dimensional electrical property measuring device of claim 1, wherein current stability of the nonuniform microchannel varies according to a ratio of the cross-sectional areas between the plurality of flow channels.

6. The three-dimensional electrical property measuring device of claim 1, wherein an interval between the ion-selective permeable membrane and the non-uniform microchannel is from several to several hundreds of micrometers (μm).

7. The three-dimensional electrical property measuring device of claim 1, wherein the plurality of flow channels are aligned perpendicular to the ion-selective permeable membrane.

8. The three-dimensional electrical property measuring device of claim 1, wherein the plurality of flow channels have a circular or polygonal cross-section.

9. The three-dimensional electrical property measuring device of claim 1, wherein one end and an other end of the plurality of flow channels are formed open to allow inflow and outflow of the fluid in the non-uniform microchannel.

10. The three-dimensional electrical property measuring device of claim 1, wherein the ion-selective permeable membrane comprises a porous scaffold or matrix on which cells or tissues are cultured.

11. The three-dimensional electrical property measuring device of claim 10, wherein the ion-selective permeable membrane further comprises a cell membrane derived from the cells or tissues and defined on the porous scaffold or matrix.

12. The three-dimensional electrical property measuring device of claim 1, wherein the plurality of flow channels includes a first group of flow channels and a second group of flow channels.

13. The three-dimensional electrical property measuring device of claim 12, wherein at least one of the first group of flow channels has a cross-sectional area that is different from a cross-sectional area of at least one of the second group of flow channels.

14. The three-dimensional electrical property measuring device of claim 12, wherein at least one of the first group of flow channels has a shape that is different from a shape of at least one of the second group of flow channels.

15. The three-dimensional electrical property measuring device of claim 12,
wherein the first group of flow channels and the second group of flow channels are arranged in different rows, and
wherein a row of the first group of flow channels is positioned adjacent to a row of the second group of flow channels in a consecutive order.

16. The three-dimensional electrical property measuring device of claim 1, further comprising an electrode holder stacked on the ion-selective permeable membrane.

17. The three-dimensional electrical property measuring device of claim 16, further comprising an electrode being located in an electrolyte solution in a state of being adhered to the electrode holder.

18. The three-dimensional electrical property measuring device of claim 1, wherein the insertion holder includes a protrusion defined on a periphery of one side of the insertion holder, and at least one leg disposed on an other side of the insertion holder.

19. The three-dimensional electrical property measuring device of claim 18,
wherein an ion-selective permeable membrane structure having an accommodating part defined on one surface thereof is stacked on the insertion holder,
wherein the accommodating part is configured to accommodate the protrusion of the insertion holder, and
wherein the protrusion engages with the accommodating part and fix the ion-selective permeable membrane therebetween.

* * * * *